United States Patent [19]

Chaffiotte et al.

[11] 4,429,853
[45] Feb. 7, 1984

[54] DISCONNECTING VALVE ROCKER MECHANISM

[75] Inventors: Pierre Chaffiotte, Saint Cloud; Christian Guicherd, Le Pecq, both of France

[73] Assignee: Regie Nationale des Usines Renault, Boulogne-Billancourt, France

[21] Appl. No.: 258,315

[22] Filed: Apr. 28, 1981

[30] Foreign Application Priority Data

May 8, 1980 [FR] France .................... 80 10284
Oct. 17, 1980 [FR] France .................... 80 22235

[51] Int. Cl.³ .................................... F02D 13/06
[52] U.S. Cl. ........................ 123/198 F; 123/90.16
[58] Field of Search .......... 123/198 F, 90.17, 90.18, 123/90.15, 90.16

[56] References Cited

U.S. PATENT DOCUMENTS

| | | | |
|---|---|---|---|
| 2,528,983 | 11/1950 | Weiss | 123/198 F |
| 4,161,166 | 7/1979 | Roznovsky | 123/198 F |
| 4,173,209 | 11/1979 | Jordan | 123/198 F |
| 4,203,397 | 5/1980 | Soeters | 123/198 F |
| 4,204,512 | 5/1980 | Brock | 123/198 F |
| 4,245,596 | 1/1981 | Bruder et al. | 123/198 F |
| 4,249,488 | 2/1981 | Siegla | 123/198 F |
| 4,336,775 | 6/1982 | Meyen | 123/198 F |
| 4,352,344 | 10/1982 | Aoyama et al. | 123/90.18 |

FOREIGN PATENT DOCUMENTS

| | | |
|---|---|---|
| 2115631 | 7/1972 | France . |
| 2311179 | 12/1976 | France . |
| 2341045 | 9/1977 | France . |
| 264716 | 10/1949 | Switzerland . |
| 529075 | 11/1940 | United Kingdom . |

Primary Examiner—Ira S. Lazarus
Attorney, Agent, or Firm—Oblon, Fisher, Spivak, McClelland & Maier

[57] ABSTRACT

The invention concerns a rocker mechanism designed to put out of use at least one cylinder, or a group or row of cylinders, of an internal combustion engine by acting on the inlet valve. The mechanism includes at least one rocker comprised of two components meshed with one another, one of those components controlling the inlet valve of the cylinder while the other is controlled by the cam shaft of the engine, and associated with control means allowing for the disconnection of the rocker components from one another. Application is to energy savings.

11 Claims, 6 Drawing Figures

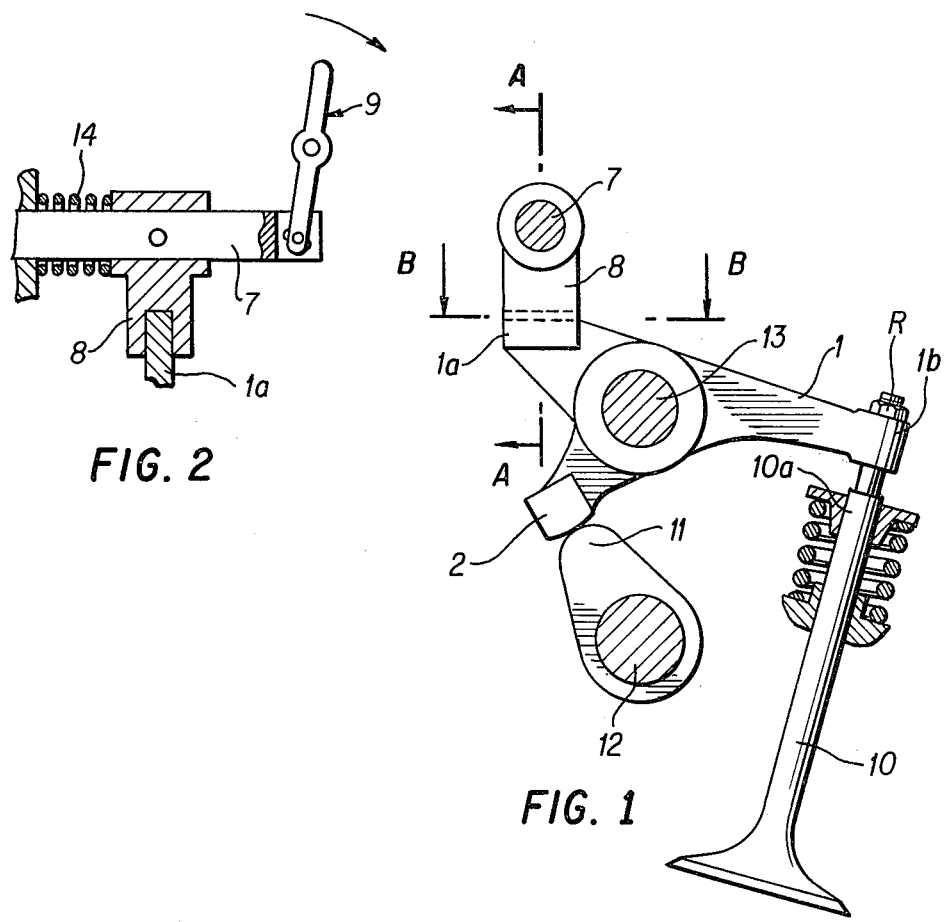
FIG. 2
FIG. 1
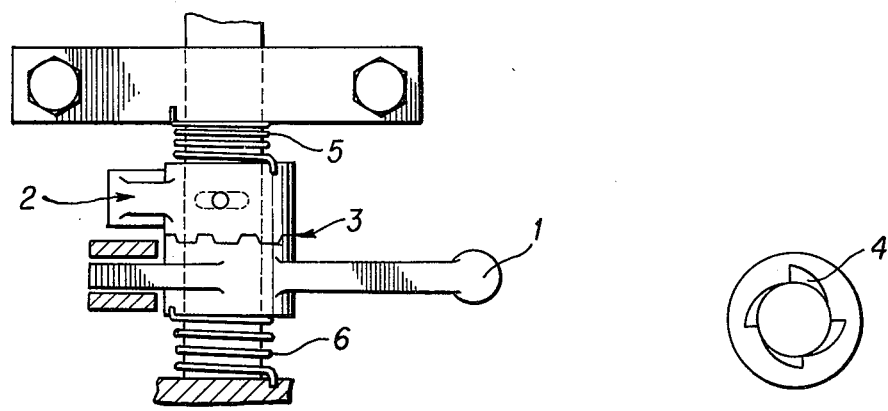
FIG. 3
FIG. 4

DISCONNECTING VALVE ROCKER MECHANISM

BACKGROUND OF THE INVENTION

1. Field of the Invention

This invention pertains to a rocker mechanism that can be used to reduce fuel consumption in a vehicle with an internal combustion engine, especially one having V-cylinders.

2. Description of the Prior Art

There are in the prior art many mechanisms which attempt to resolve the problem of saving energy. In certain such mechanisms, which are least costly, air exhaust gas is recycled inside cylinders which are not operative. The disadvantage with these systems lies in the fact that the reduction in fuel consumption is not substantial. Other more efficient mechanisms are designed to close the inlet valves of the cylinders that are to be put out of use. But those mechanisms are usually of a complicated design, hence costly to manufacture.

SUMMARY OF THE INVENTION

This invention is intended to obviate the disadvantages of the systems of the prior art with a simple mechanism of the kind that acts to shut the inlet valves of a cylinder, or of a group or a row of cylinders.

To this end, the invention concerns a mechanism of the kind which includes at least one rocker comprised of two components meshed with one another, one of those components controlling the inlet valve of the cylinder while the other is controlled by the motor cam shaft, and control means that enable the disconnection of those rocker components from one another.

Preferably, the rocker component controlling the inlet valve is so formed, in the disconnected state of the mechanism, so as to maintain said valve in a closed position.

According to a characteristic of the invention, the rocker component controlling the inlet valve is mounted in sliding fashion on a rocker ramp while the rocker component controlled by the cam shaft is attached axially to said ramp while being capable of turning at a certain angle around the latter.

According to another characteristic of the invention, it is also planned to have initial elastic means and secondary elastic means, mounted on the rocker ramp, designed to maintain the components respectively in contact with the valve stem and the cam shaft.

According to a specific embodiment of the invention, the control means includes two fluid jacks under pressure and connected one to the other by a pipe circuit for fluid supplied from a joint reserve, one of the jacks designed to be activated from the vehicle to activate in turn the second jack which controls the disconnection of the rocker mechanism, the jacks being also equipped with recall means.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a side view of a rocker according to this invention;

FIG. 2 is a view according to line A—A of FIG. 1;

FIG. 3 is a view from above according to line B—B of FIG. 1;

FIG. 4 is a view of the tip of a detail of a disconnecting rocker component according to the invention;

DETAILED DESCRIPTION OF THE PREFERRED EMBODIMENTS

Figure 5:
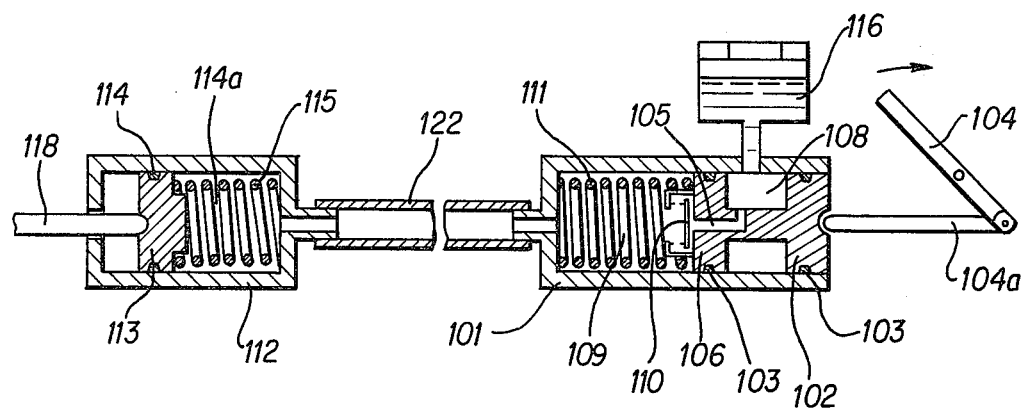
FIG. 5 is an axial lengthwise section of another embodiment of the control means of the disconnecting rocker mechanism according to the invention.

Referring firstly to FIGS. 1 and 4, the rocker according to the invention is comprised of two components 1 and 2 meshed at their facing zones and surrounding the shaft 13 of the rocker. The facing zones of the rocker components 1 and 2 include respectively teeth 3 and castellated ramps 4. The rocker component 1 is mounted in sliding fashion onto shaft 13. Between the bearing and the component 2 of the rocker a spiral spring 5 is mounted onto shaft 13 which is designed to maintain the rocker 2 at rest on the cam 11 of the cam shaft 12. With conventional means such as grooves and the like, the position of the rocker 2 is maintained in the axial direction, while the rocker 2 is capable of turning by a certain angle around the rocker shaft 13. With a spring 6, the rocker components 1 and 2 are maintained in a fitting relationship, while spring 6 is also used for biasing the rocker 1 onto the valve stem 10a. Such an arrangement prevents slack between the rocker component 1 and the inlet valve 10. The stem 10a of that inlet valve displays a tip surface which is sufficiently large (there may also be a washer, not depicted) so that the rocker component 1 is always resting on the valve stem 10a, regardless of the position of the component 1 as a function of the component 2 and especially in the disconnected position of those two constituent components of the rocker.

In order to displace the rocker component 1 in the axial direction on its shaft 13, one possible control means comprises a fork 8, fixedly mounted on a shaft 7, the motion of which (therefore that of the fork) is controlled by the lever 9. In case several rockers are mounted on the shaft 13 to put out of use as many cylinders, the same number of forks must be mounted on the shaft 7. When one wants to deactivate one or a row of cylinders, all that is needed is to move the lever 9. The lever 9 can be activated either manually, or by an automatic system tied to the power required of the vehicle powered by the engine.

In a disconnected state, the rocker component 1, while sliding on its shaft 13, remains at rest on the valve stem 10a, because the configuration of the latter maintains the inlet valve 10 closed, while the component 2, affixed axially on its shaft 13, remains controlled by the cam 11 of the shaft 12, hence the cylinder is working under vacuum.

To engage anew the components 1 and 2, it is sufficient to have the stress removed from the lever 9 so that the fork 8 tied at 1a to the rocker component 1 regains its initial position and returns said rocker component 1 into meshed condition on the rocker component 2, which reactivates the cylinder by reopening the inlet valve.

Figure 6:
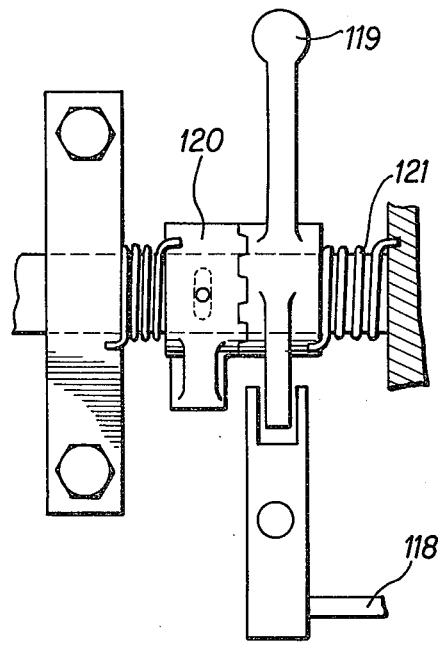
FIG. 6 is a view from above of a disconnecting rocker linked to the control means of FIG. 5.

FIGS. 5 and 6 illustrate another embodiment of control means of the rocker mechanism according to the invention.

Those control means include a hydraulic cylinder 101 placed in the enclosure of the vehicle and including a piston comprised of two components 102 and 106. On each of the piston components a gasket 103 is formed. The piston is controlled by a push rod 104a connected in pivotal fashion by one tip to a control lever 104 and resting with its other tip on the outer side of the piston component 102. In the piston 102 and 106 a channel 105 is formed which allows the control fluid to go from the fluid storage 116 to the chamber 109. On the piston component 106 a check valve 110 is mounted which is of conventional design and which does not enable the fluid to go from the chamber 109 to the chamber 108 which is in contact with the storage area 116. The shape of the check valve is not critical, the latter can be either a disc, a ball, a cone, etc. A spring 111 is placed between the bottom of the cylinder and the piston component 106.

A hydraulic cylinder 112 mounted in the engine chamber includes a piston 113 equipped with a conventional gasket 114, a chamber 114a, a spring 115 mounted between the bottom of the cylinder and the piston. The stem 118 which controls the disconnecting rocker is connected to a concave in the side of the piston 113.

The two hydraulic cylinders described above are supplied with viscous fluid, for instance braking liquid, and connected by a rubber hose 122.

With respect to small vehicle loads and in order to reduce consumption, the driver pulls the lever 104 in the direction of the arrow as indicated on the plate. The stem 104a pushes the two piston components 102 and 106 towards the left. The check valve 110 prevents the liquid from escaping through channel 105. The displacement of the liquid therefore pushes the piston 113 of the hydraulic cylinder 112 which, in turn, pushes the stem 118. The rocker component 119 which controls the inlet valve is thus disconnected from the rocker component 120 which is controlled by the cam shaft and, subsequently, the inlet valve remains at rest on its seat. In an engine with cylinders arranged in V-fashion, a row of cylinders is no longer supplied because the respective inlet valves are shut. Hence, fuel consumption saving is obtained.

If the driver needs greater power in the engine, he pushes the lever 104 in the direction opposite the arrow in the Figure. The stem 104a moves to the right. With the action of the spring 111, the two piston components 102 and 106 move to the right, the spring 121 being stronger than the spring 115 of the hydraulic cylinder 112. The rocker component 119 is shifted onto the rocker component 120. The piston 113 moves to the right and compresses the spring 115. The inlet valve controlled by the rocker 119 resumes its operation. In an engine of which the cylinders are arranged in V-shape, all the cylinders are therefore supplied through the opening of the respective inlet valves, which leads to the acquiring of regular engine power.

The diameter of the piston 113 can be identical or greater than that of the piston 106, according to whether one wishes to obtain greater stress on the stem 118.

The gaskets of the pistons 103 and 114 are conventional, for instance flange joints, O-ring seals and others. In the event of a very slight leak of control fluid, the storage area 116 may provide the required amount. If there is a loss a liquid through chamber 108, the make up of fluid may take place by gravity from the storage area 116. If there were a loss in the chambers 109 and 114a, during the displacement of piston 106 to the right, this would lead to a depression in the fluid level in chambers 109 and 114a, and the check valve, the spring of which is weak, may open in such a way as to allow for make-up of control fluid to fill anew the chambers 109 and 114a. The control of lever 104 can thus be connected by a suitable braking gear at the gas pedal so that, in the weak strokes of the pedal, it can maintain the rocker 119 disconnected, while in the powerful strokes of the pedal the rocker 119 may be connected advantageously. Hence, one can make the engine operate automatically, either for consumption savings, or for optimal power.

This control means in conformity with the embodiment of FIGS. 5 and 6 offer the benefits of displaying an activating force which is sufficiently great for disconnecting the two rocker components, displaying a sufficiently swift action speed so that disconnection takes place almost instantaneously and being of high reliability. Also they are less expensive than the electromagnetic and electromechanical control mechanisms which require the use of a coil that develops a force of several decaNewtons (daN).

From the above, one realizes that the rocker mechanism as described ensures a gain in fuel economy achieved by:

(1) the elimination of a row of cylinders when low power is required of the engine, which leads to high thermodynamic engine yield.

(2) A reduction of the suction losses of the OTTO cycle, because the inlet valves of a row of cylinders are shut. The work of vacuum creation in the cylinders is restored when the pistons come up to top dead center.

(3) A restoration of energy which would have been necessary to activate the recall springs of the inlet valves now closed by the rocker component 1.

It is clear that invention is in no way restricted to the embodiment of the above described rocker, but that it encompasses all the alterations and variations stemming from the same basic principle, or the embodiment of a rocker with two disconnecting components, one of which is controlled by the cam shaft, while the other controls the inlet valve.

Furthermore, the elastic means designed to maintain the rocker components respectively in contact with the valve stem and the cam shaft can be springs of any shape, leaning or hooked to the rocker components.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rocker mechanism for putting out of use at least one cylinder of an internal combustion engine, said mechanism comprising:
   a rocker shaft;
   at least one first rocker element pivotally mounted on said shaft, said first rocker element including a first meshing portion formed on a first axial face thereof and being adapted to control an inlet valve of a cylinder by the pivoting of said first rocker element on said shaft;
   at least one second rocker element pivotally mounted on said shaft, said second rocker element including a second meshing portion formed on a second axial face thereof facing said first axial face and being adapted to pivot in response to an engine cam shaft, wherein each said first rocker element is mounted on said shaft in an axially slidable manner, and wherein each said second rocker element is mounted on said shaft in an axially fixed manner and includes means for permitting relative angular movement between said shaft and each said second rocker element; and control means mounted on a stationary portion of said engine for selectively axially moving said first rocker element such that said first and second meshing portions are meshing with one another, whereby said first and second rocker elements pivot as a single body.

2. The mechanism of claim 1 including means for positioning each said first rocker element so as to maintain each said inlet valve in a closed state when said meshing portions are disengaged.

3. The mechanism of claim 1 including first biasing means mounted on said shaft for biasing each said first rocker element into contact with each said inlet valve and second biasing means mounted on said shaft for biasing each said second rocker element into contact with said cam shaft.

4. The mechanism of claim 2 wherein said control means comprise:
a first fluid jack including an output means mechanically engaged with one of said rocker elements;
a second fluid jack including a fluid reservoir; and
a fluid line connected between said jacks.

5. The mechanism of claim 4 wherein said first and second jacks comprise cylinders and said fluid comprises oil.

6. The mechanism of claim 4 wherein said second jack includes a manually actuated mechanical input means.

7. The mechanism of claim 4 wherein said second jack includes a mechanical input means actuated by an engine condition.

8. The mechanism of claim 4 wherein said first jack is adjacent the engine and said second jack is within the vehicle passenger compartment.

9. The mechanism of claim 4 wherein said second jack comprises:
a first cylinder;
a first piston movable in said first cylinder, said first piston including axially spaced first and second portions defining a space therebetween;
a fluid chamber defined by said first portion of said first piston and a portion of said second jack, to which said fluid line is connected;
a first passage extending in said first piston and communicating said fluid chamber and said space;
a check valve associated with said first passage; and
mechanical input means connected to said second portion of said first portion for moving said first piston axially in said first cylinder.

10. The mechanism of claim 9 wherein said first jack comprises:
a second cylinder; and
a second piston movable in said second cylinder;
wherein said output of said first jack comprises a stem adapted to disengage said rocker elements.

11. The mechanism of claim 10 including:
biasing means for biasing said rocker elements into engagement;
first spring means in said first cylinder for biasing said first piston; and
second spring means in said second cylinder for biasing said second portion, wherein said biasing means are stronger than said second spring means.

* * * * *

UNITED STATES PATENT AND TRADEMARK OFFICE
CERTIFICATE OF CORRECTION

PATENT NO. : 4,429,853

DATED : February 7, 1984

INVENTOR(S) : Pierre Chaffiotte et al

It is certified that error appears in the above-identified patent and that said Letters Patent is hereby corrected as shown below:

On the title page, Item [75] should read as follows:

-- Pierre Chaffiotte, Saint Cloud; Christian Guicherd, Le Pecq; Alain Saindon, Boulogne Billancourt, all of France - -

Signed and Sealed this

Seventeenth Day of April 1984

[SEAL]

Attest:

GERALD J. MOSSINGHOFF

Attesting Officer

Commissioner of Patents and Trademarks